United States Patent
Crabtree (10) Patent No.: US 6,182,837 B1
(45) Date of Patent: Feb. 6, 2001

(54) METHOD AND APPARATUS FOR SECURE STORAGE AND HANDLING OF ELONGATE OBJECTS

(75) Inventor: Michael W. Crabtree, Katy, TX (US)

(73) Assignee: CargoMax, Katy, TX (US)

( * ) Notice: Under 35 U.S.C. 154(b), the term of this patent shall be extended for 0 days.

(21) Appl. No.: 09/481,786

(22) Filed: Jan. 12, 2000

(51) Int. Cl.⁷ .................................................. A47F 7/00
(52) U.S. Cl. .................. 211/59.4; 211/70.4; 206/443; 410/40
(58) Field of Search .................. 211/59.4, 70.4, 211/60.1; 248/68.1; 410/36, 39, 40, 42; 206/443

(56) References Cited

U.S. PATENT DOCUMENTS

| | | |
|---|---|---|
| 561,715 | 6/1896 | Lynch . |
| 1,793,059 | 2/1931 | Chambers . |
| 2,149,589 | 3/1939 | Duaei . |
| 2,248,119 | 7/1941 | Reed et al. . |
| 2,404,531 * | 7/1946 | Robertson . |
| 2,591,049 | 4/1952 | Butsch . |
| 2,849,027 * | 8/1958 | Tetyak . |
| 3,537,599 | 11/1970 | Jay . |
| 3,612,286 | 10/1971 | Langowski et al. . |
| 3,616,941 | 11/1971 | Walling . |
| 3,945,497 | 3/1976 | Greenberg . |
| 4,195,732 * | 4/1980 | Bell . |
| 4,380,297 | 4/1983 | Frias . |
| 4,553,888 * | 11/1985 | Crissy et al. . |
| 4,706,822 | 11/1987 | Remp, Jr. et al. . |
| 4,936,450 * | 6/1990 | Paul . |
| 5,060,810 * | 10/1991 | Jones ................................ 211/59.4 |
| 5,123,547 | 6/1992 | Koch . |
| 5,188,503 | 2/1993 | Appelberg . |
| 5,605,239 * | 2/1997 | DeVoursney et al. ........... 211/182 X |
| 5,860,627 * | 1/1999 | Edwards ............................. 248/68.1 |
| 5,876,165 | 3/1999 | Campbell . |
| 5,964,557 | 9/1999 | Eng . |
| 6,033,167 * | 3/2000 | Bourgeois ......................... 410/36 X |
| 6,119,861 * | 9/2000 | Schneider ............................ 206/443 |

* cited by examiner

Primary Examiner—Robert W. Gibson, Jr.
(74) Attorney, Agent, or Firm—DeMont & Breyer, LLC; Wayne S. Breyer; Jason Paul DeMont (57) ABSTRACT

An improved packing member includes a rigid interior portion enclosed by a resilient exterior portion. The exterior portion is physically adapted to generate a force in response to, and opposing, the motion of an elongate object thereover. The generated force advantageously increases in magnitude as the object moves across a packing member. In some embodiments, a frame receives the improved packing members. In one embodiment, the frame comprises two vertical side portions that receive one or more packing members. The frame advantageously includes a variable-positioning element, so that the packing members are freely positionable along the height of the vertical side portions. In conjunction with the improved packing member, the variable positioning element enables embodiments of the present invention to be used with multiple object diameters/geometries.

20 Claims, 4 Drawing Sheets

METHOD AND APPARATUS FOR SECURE STORAGE AND HANDLING OF ELONGATE OBJECTS

FIELD OF THE INVENTION

The present invention relates to an article and method for the secure storage, handling and transportation of pipe or other relatively rigid, elongate objects.

BACKGROUND OF THE INVENTION

Pipe is used in countless applications in a wide variety of industries. In one application, "drill pipe" is used for drilling bore holes for crude oil recovery. Such drilling requires interconnecting many sections of drill pipe to form a "drill string" that may ultimately extend for more than one thousand feet under ground or under water.

As drill pipe sections are nominally 31 feet long and very heavy, their transportation to an offshore drilling platform can be costly and hazardous. Such transportation requires bundling the pipe at a land-based supply location, loading it onto a truck, delivering it to a dock, loading it onto a marine vessel, transporting it to the offshore platform and then unloading it for storage or use. Little can be done to circumvent such handling steps. But there is room for significant improvement in the apparatuses and methods that are used to secure such drill pipe for storage, handling and transport.

The method/apparatus most commonly employed for lifting and transporting drill pipe is to bundle the pipe with "choking slings." The bundled pipe is then lifted onto a truck, vessel, etc. using a crane. API Recommended Practices substantially limit the amount of pipe that can be handled per lift using such slings. As a result, the overall number of handling steps rapidly increase as multiple lifts are required at each stage as the pipe travels from supplier to platform. Such increased handling increases costs (e.g., labor costs, crane charges, etc.). Moreover, when tension on a loaded sling is relaxed, such as when the sling and pipes are deposited on a surface of a truck, marine vessel or drilling platform, the pipes are free to move in an uncontrolled manner presenting a risk of injury.

Specialized pipe storage/transportation apparatuses have been developed. Some of such apparatuses include spaced upright members that receive a plurality of cross members. Pipe sections are laid between such cross members (hereinafter "packing members") in an attempt to restrain such pipe segments from moving. Under harsh conditions, such apparatuses are often incapable of preventing slippage/movement of pipe. For example, the deck of a marine vessel may pitch ten to fifteen degrees in rough seas, thereby "tilting" such storage apparatuses. Under those conditions, there may be insufficient contact (i.e., frictional surface) between the pipe and packing members to prevent pipe slippage causing a potentially hazardous situation.

Figure 1:
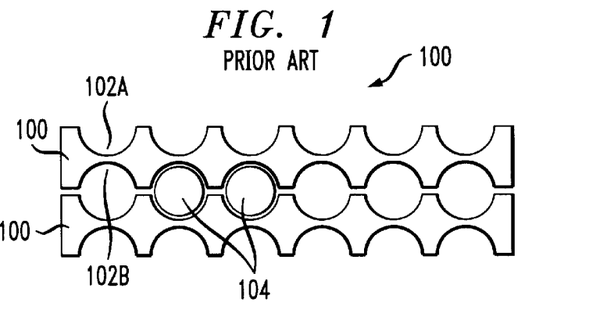
FIG. 1 depicts a cycloid-shaped cross member used for constraining cargo in the prior art.

In one prior art storage/transportation apparatus, the pipe-receiving surfaces of packing members that are used to constrain pipe are not flat, but rather cycloid-shaped, as depicted in FIG. 1. Each pipe-receiving surface of packing member 100 includes a plurality of arc-shaped regions 102A, 102B (that collectively define the cycloid-shaped profile). Each of such regions 102A, 102B are configured to receive a "matched" diameter section of pipe 104 (two pipe sections 104 are depicted in FIG. 1). Two such packing members 100 are used to sandwich pipe sections 104. A "u-shaped" frame receives a plurality of such packing members 100 stacked one above the next so that multiple rows of pipe can be constrained.

In comparison with a prior art packing member having a flat pipe-receiving surface, arc-shaped regions 102 increase surface contact with the constrained pipe. The increased surface contact decreases the likelihood of pipe slippage.

As indicated above, packing member 100 is designed to fit a specific pipe diameter (e.g., 5-inch diameter or 4½-inch diameter, etc.) as a function of the radius of curvature of arc-shaped regions 102. As such, a given packing member 100 is usable with only one size of pipe. Thus, if a load of pipe includes, for example, 3-inch, 4½-inch and 5-inch diameter pipe, correspondingly-sized packing members are required to receive such pipe. Such specificity disadvantageously increases costs and presents the possibility that appropriately-sized packing members will not be available when needed.

As such, there is a need for an improved packing member, and a storage/transportation apparatus incorporating such a packing member, that is effective in restraining movement of elongate objects yet can cost effectively accommodate multiple object diameters.

SUMMARY OF THE INVENTION

In some embodiments, an improved packing member includes a rigid interior portion enclosed by a resilient exterior portion. The exterior portion has a physical adaptation that generates a force in response and in opposition to the motion of an elongate object thereover. The generated force advantageously increases in magnitude as the object moves over a packing member.

In further embodiments, an article for constraining elongate objects includes a frame that receives the improved packing members. In the illustrated embodiments, the frame comprises two vertically oriented side portions that depend from a base. The frame advantageously includes a variable positioning element, which, in the illustrated embodiments, is a slot running the length of each of the vertical side portions. Each slot receives a tab/projection that depends from each end of the packing member. The packing members are freely positionable along the length of the slots.

The force-generating design of the packing member, and the variable positioning element enables the present article to handle multiple object diameters/geometries. For restraining very long or heavy objects, two or more frames can be rigidly interconnected.

DETAILED DESCRIPTION

The illustrated embodiments of the present invention are particularly useful for storing and transporting relatively rigid, cylindrical, elongate objects, such as drill pipe. Such embodiments are also useful for storing and transporting relatively rigid, flat, elongate objects or elongate objects having a different geometry or cross-sectional shape.

Figure 2:
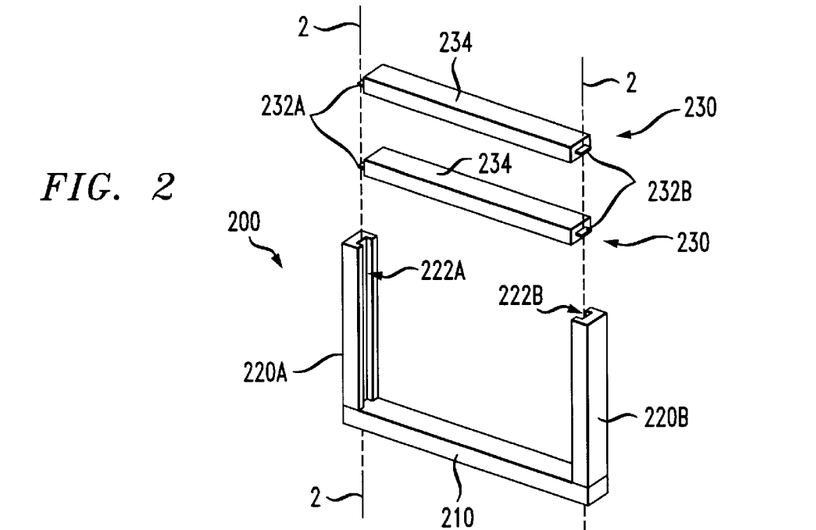
FIG. 2 depicts an article for handling elongate objects in accordance with an illustrated embodiment of the present invention.

FIG. 2 depicts storage and transport frame 200 in accordance with an illustrated embodiment of the present invention. Illustrative frame 200 is generally "u-shaped" and comprises two spaced, vertically-oriented side portions 220A, 220B that depend from base 210. In one embodiment, side portions 220A, 220B and base 210 are "discrete" elements (e.g., individually-fabricated elements) that are attached (e.g., bolted, welded, etc.) to form frame 200.

Figure 3:
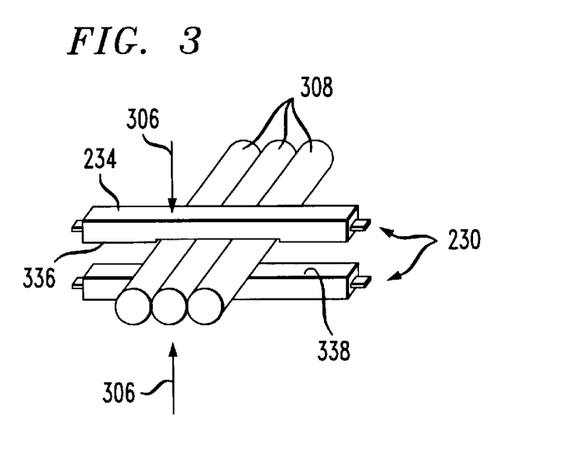
FIG. 3 depicts two illustrative packing members constraining sections of pipe.

Frame 200 has one or more physical adaptations that allow it to receive cross members 230 that, in use, are placed in underlying and overlying relation to elongate objects (e.g., drill pipe), thereby "sandwiching" such objects. FIG. 3 depicts two cross members 230 sandwiching pipe sections 308 (frame 200 omitted for clarity) to restrain such pipe sections from moving. The overlying cross member contacts pipe sections 308 at upper contact surface 336 and the underlying cross member contacts pipe sections 308 at lower contact surface 338. In conjunction with other features of the prevent invention, cross members 230 are capable of substantially immobilizing such sandwiched objects.

In one embodiment, a physical adaptation by which frame 200 receives cross members 230 (hereinafter referred to as "packing members") advantageously comprises a variable positioning element. Through such a variable positioning element, packing members 230 are freely positionable in a vertical direction (i.e., along axis 2—2) within frame 200 (hereinafter referred to as simply "variably positionable" or "variable positioning").

In one embodiment, the variable positioning element is realized by an arrangement that receives packing members 230 in sliding engagement. In the embodiment illustrated in FIG. 2, such an arrangement comprises slot or channel 222A, 222B that is formed within respective side portions 220A and 220B. Channels 222A, 222B receive respective tabs/projections 232A, 232B of each packing member 230. When so engaged by channels 222A and 222B, packing members 230 are restrained from moving except in a "vertical" direction along long axis 2—2 of side portions 220A and 220B.

Figures 4, 5:
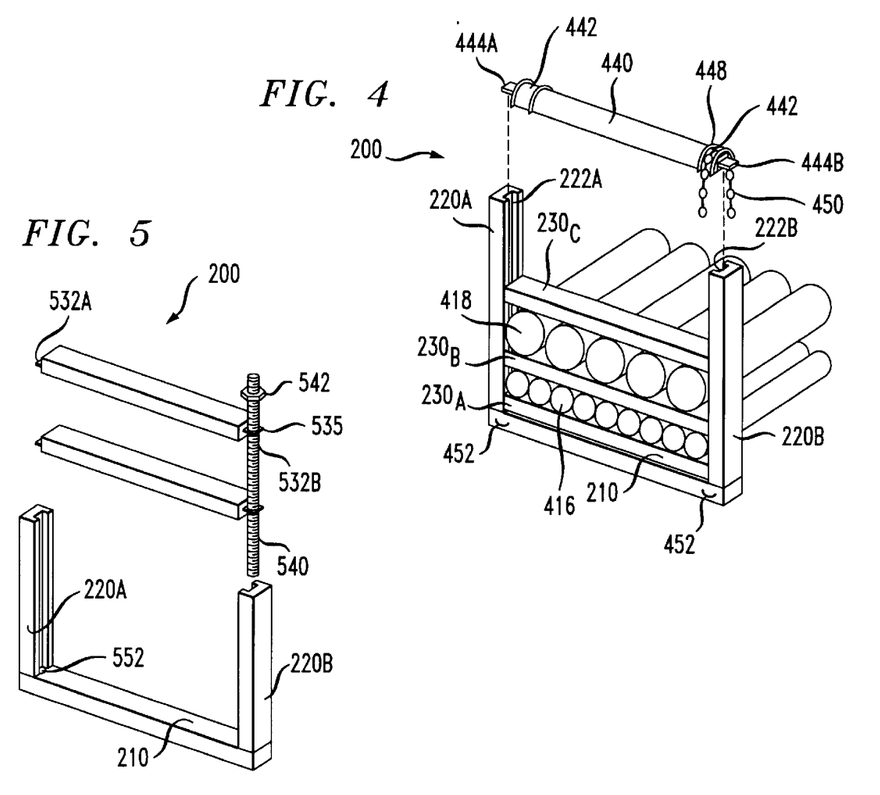
FIG. 4 depicts the present packing members constraining several rows of pipe sections within in an illustrative frame, and further depicts an illustrative embodiment of a compressing arrangement for use in conjunction with the packing members.
FIG. 5 depicts a second illustrative embodiment of a compressing arrangement for use in conjunction with the present packing members and frame.

Such variable positioning advantageously enables illustrative frame 200 and packing member 230 to store/restrain a collection of objects characterized by multiple object diameters/geometries, as is illustrated in FIG. 4.

FIG. 4 depicts the present frame and packing members receiving a first row 416 of objects having a first diameter and a second row 418 of objects having a second diameter different than the first diameter. Objects in first row 416 are restrained by packing members $230_A$ and $230_B$, and objects in second row 418 are restrained by packing members $230_B$ and $230_C$.

In the above-described manner, illustrated embodiments of the present frame and packing members can thus accommodate multiple object diameters/geometries on a row-by-row basis. It must be understood, however, that within a given row (i.e., between two given packing members), objects should have a uniform diameter (geometry) so that adequate contact between the packing members and each constrained object is assured.

In addition to providing utility for restraining a collection of objects characterized by multiple object diameters/geometries, the variable positioning means of the present invention allows for partial utilization of the packing space available within frame 200. Such partial utilization is depicted in FIG. 4, wherein room for additional rows of objects is available. Alternatively, the frame can be fully utilized, wherein additional rows of objects and additional packing members are loaded above packing member $230_C$ until reaching the top of side portions 220A, 220B.

Referring again to FIG. 3, to aid in securely restraining pipe sections 308, exterior portion 234 of packing members 230 is advantageously resilient. Due to such resilience, as the upper and lower contact surfaces 336, 338 of the overlying and underlying packing members are urged, via clamping force 306, toward pipe sections 308, such surfaces partially deform around the pipe sections. Such deformation increases surface contact between the packing member and the constrained objects (e.g., pipe sections). Such increased surface contact increases the constraining force on the constrained objects relative to a flat, non-deforming packing member.

As described further later in this specification, in some embodiments, exterior portion 234 is realized as an extruded or molded elastomer. Such an elastomeric exterior advantageously encloses a rigid (e.g., steel) inner portion (not shown in FIG. 3) that resists deformation along vertical, lateral and longitudinal axes.

In accordance with the present teachings, and in some embodiments of the present invention, exterior portion 234 has one or more physical adaptations that generate a restraining force in response to motion of an elongate object thereover. The elongate object's motion can be due, for example, to the pitching of the deck of a vessel in rough seas. The generated force opposes motion of the object and advantageously increases in magnitude as the object moves across a packing member. The increasing resistive force rapidly overcomes the force urging the object to motion, thereby stopping such motion. Further description of such physical adaptations is provided later in this Specification.

Drill pipe and other objects are very heavy and will cause packing members 230 to deform to some extent without an additional externally applied clamping force. Of course, the uppermost packing member is not subjected to an overlying layer of objects. Therefore, to constrain objects in an uppermost row within a frame (and, as a practical matter, to secure all objects in the frame), a clamping/compressing force is applied to the packing members in addition to the compressing force supplied by the weight of the constrained objects.

The clamping/compressing force can be suitably applied via a variety of mechanisms/arrangements. In a first embodiment depicted in FIG. 4, lock-down member 440 is received by frame 200 on top of the uppermost packing member (i.e., packing member $230_C$ in FIG. 4). In the illustrated embodiment, projections 444A and 444B are received by respective slots 222A and 222B in the side portions of the frame. In one embodiment, the upper surface of lock-down member 440 includes two pairs of ridges 448 that define grooves 442. Such grooves 442 each receive a strong cable, chain, strap or like element 450 that is placed under tension to force lock-down member 440 downwardly towards uppermost packing member 230$_C$ applying a compressive or clamping force thereto. For clarity, only one chain 450 is depicted in FIG. 4.

In one embodiment, each chain 450 is fastened, at one end, to lugs 452 disposed near the bottom of each side portion 220A, 220B. The other end of chain 450 is connected to a tensioning mechanism (not shown), such as, for example, a well-known ratchet tensioning mechanism. The ratchet tensioning mechanism is also secured to a further lug (not shown) on the opposite side of frame 200 from lugs 452. In well-known fashion, the ratchet tensioning mechanism is tightened thereby placing chain 450 in tension to exert a downwardly-directed force on lock-down member 440, and, hence, a clamping force on the underlying packing members and constrained objects.

In a second embodiment depicted in FIG. 5, the clamping/compressing force is applied via lock-down rod 540. In particular, projections 532A and 532B (for engaging the slot in side members 220A and 220B) depending from the packing members each include a hole 535. Holes 535 receive lock-down rod 540. The lock-down rod is received, at its lower end, by receiver hole 552 in base 210 of frame 200. The lock-down rod is advantageously threaded to receive nut 542. Nut 542 is drawn down on lock-down rod 540, compressing or clamping the packing members and constrained objects.

For clarity of presentation, only one threaded rod 540 is shown in FIG. 5 (depicted as being engaged by hole 535 in projection 532B at the "right" side of the packing members). It will be understood that such a threaded rod advantageously engages holes 535 in the projections on each end of the packing members.

The illustrative arrangements described above, hereinafter referred to as a "compressing arrangement," can be used for securing frames that are either partially or fully loaded with elongate objects. The described compressing arrangements can be used independently of each other or in cooperation with one another to secure objects within frame 200.

Figure 6:
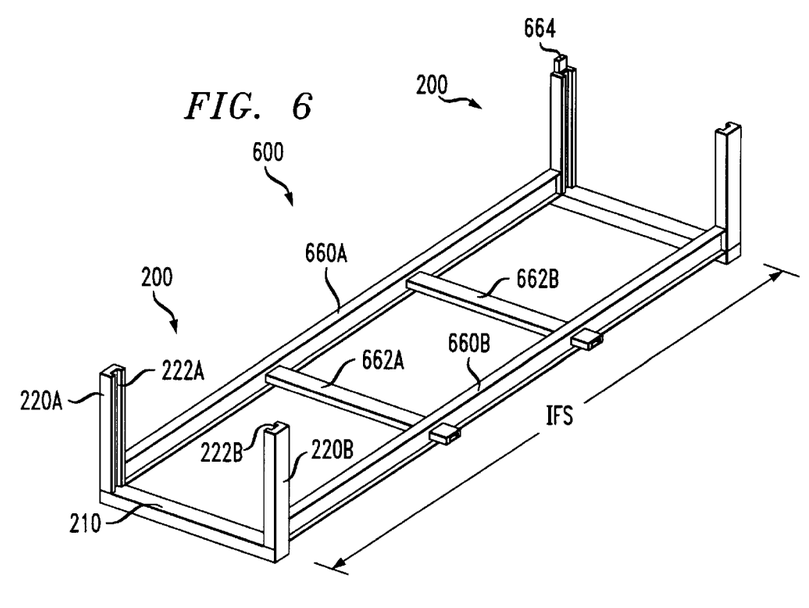
FIG. 6 depicts an apparatus wherein two of the frames of FIG. 2 are interconnected.

It is advantageous for at least two frames 200 to be used cooperatively to restrain relatively long objects. In such embodiments, it is advantageous, but not necessary, to interconnect such frames. FIG. 6 depicts an illustrative multi-frame apparatus 600 in accordance with the present teachings wherein two frames 200 are interconnected to facilitate the storage and transportation of long objects, such as, for example, 31-feet-long drill pipe sections.

In the illustrated embodiment, frames 200 are joined via two connector members 660A and 660B. Such connector members are advantageously joined to frames 200 near base 210. Connector members 660A and 660B and frames 200 may suitably be provided with flanges that align for bolting, or the connector members and frames can be welded together. In a further embodiment (not depicted), frames 200 are adapted to slidingly engage connector members 660A and 660B such that they can be variably positioned along the length of the connector members. Once positioned, frames 200 are then tightened down, bolted, etc., to the connector members.

In the embodiment depicted in FIG. 6, the attachment of connector members 660A and 660B to frames 200 creates a generally rectangular base between the two frames. Such an arrangement provides a rigidity to apparatus 600 that is not present when multiple frames are used in the absence of such interconnections. Moreover, transportation of constrained objects is facilitated by apparatus 600 as it is advantageously provided with lifting lugs or "padeyes" (not depicted) that can receive sling(s) that allow apparatus 600 to be readily lifted by a crane, etc.

In some embodiments, apparatus 600 includes forklift receivers 662A and 662B for receiving prongs of a forklift (not shown) to facilitate transport of apparatus 600. Moreover, a stacking lug 664 that is located on top of each side portion 220A, 220B of each frame 200 (only one is depicted in FIG. 6), is received by a socket (not shown) appropriately located in base 210 of each frame 200. Such stacking lugs and sockets allow apparatuses 600 to be stacked one above another.

In use, elongate objects (e.g., drill pipe, etc.) of like diameter/geometry are loaded onto a lowermost packing member. The weight of such objects deforms the resilient exterior of the lowermost packing member. The lowermost packing member can be configured differently from other packing members since only the upper surface of the lowermost packing member is in contact with pipe.

Objects are laid substantially completely across the packing member, as depicted in FIG. 4. A second packing member is then engaged to the frame by, for example, positioning the projections 232A, 232B within channels 222A, 222B of side portions of each frame (assuming a multiple frame apparatus such as illustrative apparatus 600). The second packing member is slid down the channels to rest on top of the layer (e.g., layer 416 in FIG. 4) of drill pipe sections. A further layer of drill pipe of a uniform diameter is then loaded and the process is continued until the desired amount of drill pipe is loaded or until the frame is full. A final packing member is engaged to the channel and positioned to abut the uppermost layer of drill pipe.

A compressing arrangement is then engaged to the frame and applied such that the various drill pipe sections, and the packing members that sandwich them, are clamped together such that a compressive force is exerted thereon. In one embodiment, the compressing arrangement comprises top member 440, chains 450 and a tensioning mechanism (as in the embodiment depicted in FIG. 4). In another embodiment, the compressing arrangement comprises threaded rod 540 and nut 542 (as in the embodiment depicted in FIG. 5). Other compressing arrangements as will occur to those skilled in the art may suitably be used in conjunction with the present invention.

A space/gap IFS between frames 200 (hereinafter "inter-frame spacing") in illustrative apparatus 600 is primarily dependent upon the length and material properties of the elongate object being constrained. Suitable inter-frame spacing IFS is readily determined by simple experimentation. In particular, it will be appreciated that for a two-frame apparatus such as apparatus 600, as inter-frame spacing IFS is reduced, so is the cost and weight of the apparatus 600. But, the decrease in inter-frame spacing IFS is accompanied by an increase in the portion of the elongate object that will be cantilevered beyond each frame. At some point, the portion of the elongate object that is cantilevered may be determined to be "excessive." Such a determination may be made, for example, by supporting the object at various test locations and observing the physical response of the object (e.g., flexion, sagging, etc.). Additionally, x-rays can be taken to ascertain if there is any effect on material integrity (e.g. stress fractures, etc.) due to any observed flexion, etc.

For an apparatus having two interconnected frames, such as apparatus 600, an inter-frame spacing IFS of about fifteen feet has been found to be suitable for carrying steel drill pipe having a nominal length of 31 feet. In such an apparatus, drill pipe sections are advantageously positioned such that about one-quarter of the length of each pipe section is cantilevered beyond each frame, leaving about one-half the length of the pipe section between the two frames.

In other embodiments (not shown), a multi-frame apparatus in accordance with the present teachings has more than two frames. Such additional frames may be required, for example, to support elongate objects having a length greater than 31 feet or objects that are particularly heavy, as may result from a particularly dense material of construction, a large diameter/pipe-wall thickness, etc. Again, the number of frames required and inter-frame spacing IFS is readily determined by simple experimentation.

Frame width may be selected, for example, based on commercial considerations. In one embodiment, maximum frame width is advantageously 42 inches. This width allows two of such frames (or two multi-frame apparatuses) to be located side-by-side on a flat-bed truck (while complying with rules for vehicle width on the roads).

As previously indicated, in some embodiments, a force that opposes motion of an elongate object is generated as that elongate object begins moving over the exterior portion 234 of a packing member. In preferred embodiments, the generated force increases in magnitude with continued movement of the object.

In some embodiments, the force is generated by one or more physical adaptations of the resilient exterior portion itself. In the illustrated embodiments, the force-generating physical adaptation of the resilient exterior portion comprises a configuration that results in a regionally-variable compression of the resilient exterior portion as an object moves thereover. In response to such regionally-variable compression, the resilient exterior portion exerts a force against the constrained (but moving) object.

In the illustrated embodiments, the regionally variable compression-causing configuration comprises a non-uniform object-receiving surface. As used herein, the phrase "non-uniform object-receiving surface" is meant to indicate a contact surface or surface profile that is characterized by one or more features that, collectively, disrupt the uniformity of the contact surface. Such a non-uniform object-receiving surface is to be contrasted with a relatively featureless/smooth surface, such as the curved, but otherwise featureless pipe-receiving surface of prior art packing member 100 depicted in FIG. 1.

Figure 7:
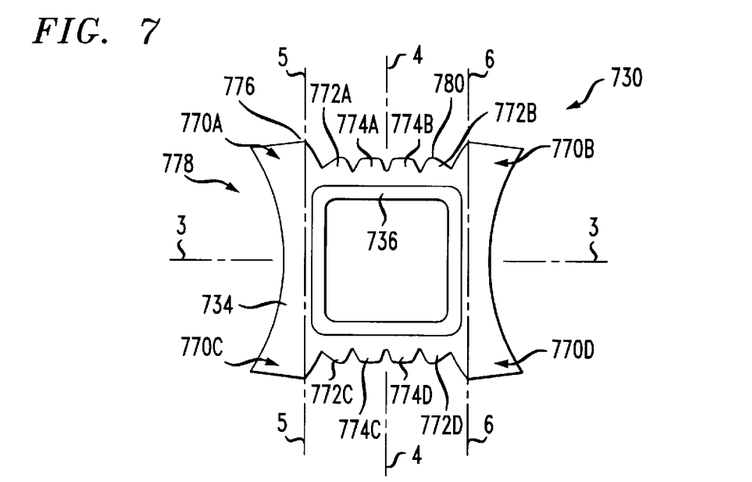
FIG. 7 depicts an illustrative non-uniform object-receiving surface of an exterior portion of the packing member in accordance with the present teachings.
Figure 8:
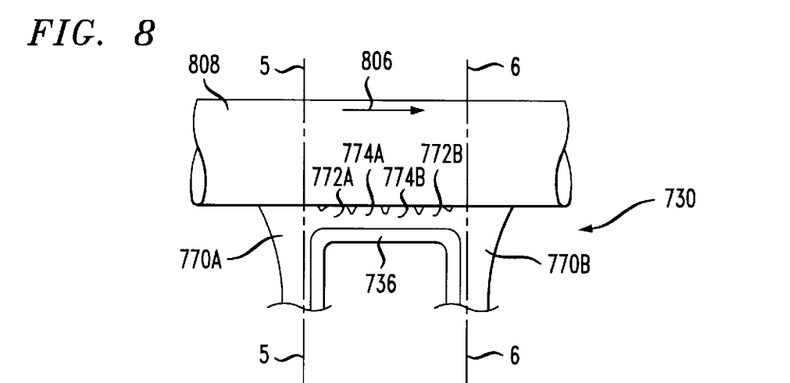
FIG. 8 depicts a section of pipe moving across the exterior portion of the packing member shown in FIG. 7.

An illustrative embodiment of a non-uniform object-receiving surface suitable for generating such force is depicted in FIG. 7, which shows a cross-section of a packing member 730. FIG. 8 depicts a response of exterior portion 734 of packing member 730 to the movement of pipe 808 along a direction 806.

Packing member 730 includes a rigid interior portion 736 that is advantageously resistant to motion in all directions (i.e., along three axes). Interior portion 736 is encased by resilient exterior portion 734. In one embodiment, illustrative exterior portion 734 comprises an elastomer that is bonded, such as via thermal bonding, to interior portion 736. Exterior portion 734 can be formed by any suitable method, such as, for example, molding, extrusion and the like.

The surface profile of illustrative exterior portion 734 includes inclined lobes 770A, 770B, 770C and 770D, asymmetric protrusions 772A, 772B, 772C and 772D, and symmetric protrusions 774A, 774B, 774C and 774D. Such lobes, asymmetric protrusions and symmetric protrusions are illustrative of features that define a non-uniform object-receiving surface.

In the illustrated embodiment, the surface profile of exterior portion 734 is symmetric with respect to vertical symmetry axis 3—3 and symmetric with respect to lateral symmetry axis 4—4. The vertical profile of exterior portion 734 (i.e., the profile across vertical symmetry axis 3—3) is advantageously configured to allow vertical (i.e., parallel to axis 4—4) displacement of exterior portion 734 with increasing (vertical) compression thereof.

As an example of a configuration suitable for providing vertical displacement under compression, exterior portion 734 includes "undercut" region 778 between upper lobes 770A (770B) and lower lobes 770C (770D). Under sufficient vertical compression, inclined lobes 770A and 770C (and 770B and 770D) are driven towards one another and may in fact even contact one another as a function of the magnitude of the compressing force. Such vertical displacement is thus facilitated via undercut region 778.

In some embodiments, the profile of exterior portion 734 is advantageously configured to allow lateral (i.e., parallel to axis 3—3) displacement of surface features (e.g., lobes, protrusions, etc.) of exterior portion 734 as the exterior portion is subjected to compression or to a force having both vertically and laterally-directed components. The lateral separation or spacing between the lobes (e.g., lobes 770A and 770B) allows for lateral displacement of the lobes when they are under compression. Similarly, the lateral spacing between adjacent asymmetric and symmetric protrusions (e.g., protrusions 772A and 774A) allows for lateral displacement of the asymmetric protrusion under compression. Another way to facilitate such lateral displacement is to "undercut" a surface feature.

Thus, under compression, such as is caused by the weight of a constrained object and/or a secondary compressing force, the various lobes and protrusions deform (both above and below vertical symmetry axis 3—3). The deformation caused by such compression exerts a force or pressure against the constrained object.

More particularly, compressive forces are resisted by the resilient material that comprises exterior portion 734. The resistance offered by the resilient material manifests as a force that is exerted against the object. When constrained by overlying and underlying packing members, and assuming that the friction coefficient between exterior portion 734 and the constrained object is sufficient, the generated force opposes any lateral motion and/or longitudinal motion (i.e., motion that is "into the page" in FIGS. 7 and 8) of the constrained object.

The magnitude of the force/pressure exerted against the object varies with the thickness of exterior portion 734 and with the compressing force applied thereto. In the illustrated embodiment, the thickness of exterior portion 734 is at a maximum along axes 5—5 and 6—6. As such, for that embodiment, the maximum force is exerted against a constrained object along such axes.

In some embodiments, such as the one depicted in FIG. 7, lobes 770A–770D and asymmetric protrusions 772A–772D are configured to exert an increasing resistance to oppose lateral movement of an object. Consider FIG. 8, which depicts an object 808, such as a pipe, moving along the direction 806 (ie., toward the right in FIG. 8).

As object 808 moves in direction 806 over inclined upper surface 776 of lobe 770A, exterior portion 734 thickens, reaching a maximum thickness along axis 5—5. As the exterior portion thickens, the force exerted by the exterior portion 734 against object 808 increases. Moreover, as lobe 770A is compressed and/or forced in direction 806, the downwardly-sloping interior upright wall of lobe 770A (i.e., the portion of lobe 770A that is to the right of axis 5—5) will compress and exert a force against the object. The greater the compressing force, the greater the force exerted by the exterior portion against the object. The exerted force will have a component directed towards the left (in FIG. 8) thereby resisting movement of the object.

In asymmetric protrusion 772B, the increase in resistive force is due to the off-centered peak 780. As a heavy object moves in the direction 806 over exterior portion 734, peak 780 of protrusion 772B are forced downwardly and to the right. The resilient material comprising exterior portion 734 resists such compression, exerting a force on object 808.

In the illustrated embodiment, the configuration of the lobes and asymmetric protrusions on one side of lateral symmetry axis 4—4 is "opposed" to (i.e., the mirror image of) the configuration of the lobes and asymmetric protrusions on the other side of the lateral symmetry axis. That is, while lobe 770A "leans" to the left, lobe 770B leans to the right. Similarly, while asymmetric protrusion 772A "leans" to the right, asymmetric protrusion 772B leans to the left. With such an arrangement, exterior portion 734 is capable of resisting movement of an object that is moving in either direction (i.e., to the left or to the right in FIG. 8).

In some embodiments, a high-friction material is disposed on contact surfaces of exterior portion 734 (e.g., the appropriate surfaces of lobes 770A–770D, etc.) to aid in reducing slippage of a constrained object. Suitable high-friction materials include, without limitation, natural or man-made crystalline particles (e.g., sand, coal slag, aluminum oxide, etc.). Note that the presence of such high-friction materials on an otherwise featureless surface will not define a "non-uniform object-receiving surface," as that phrase is used herein.

Figure 9:
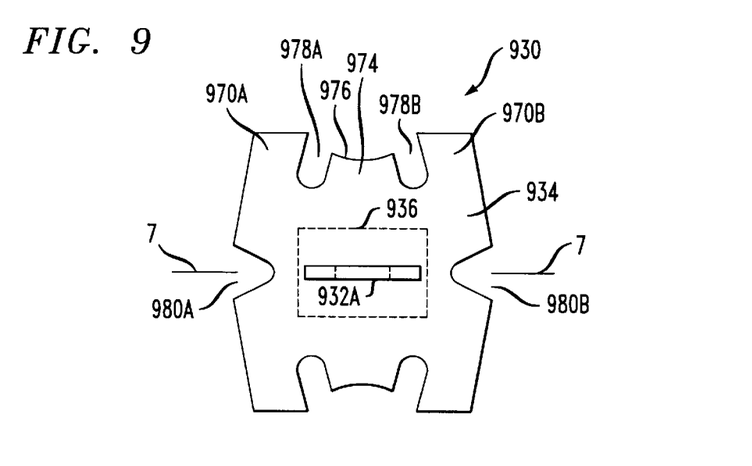
FIG. 9 depicts a second embodiment of a packing member in accordance with the present invention.
Figure 10:
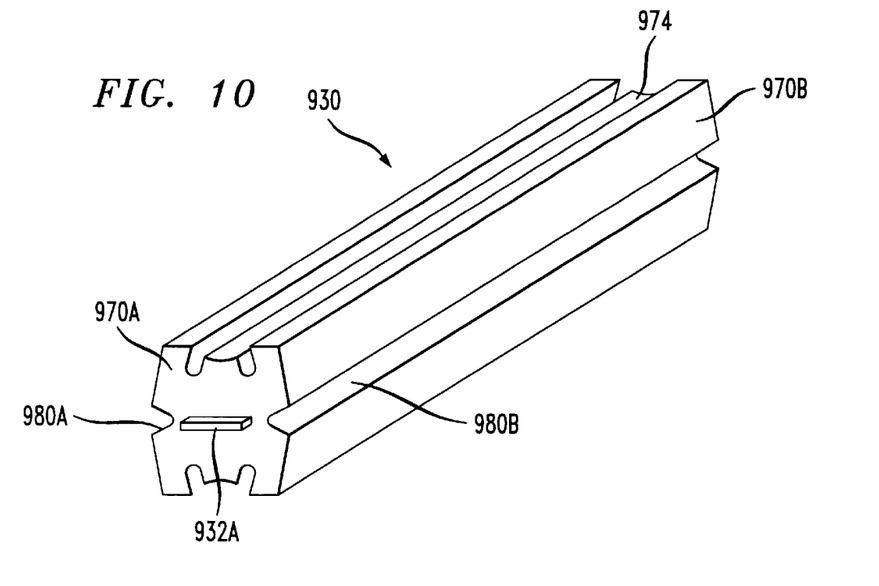
FIG. 10 depicts a perspective view of the packing member of FIG. 9.
Figure 11:
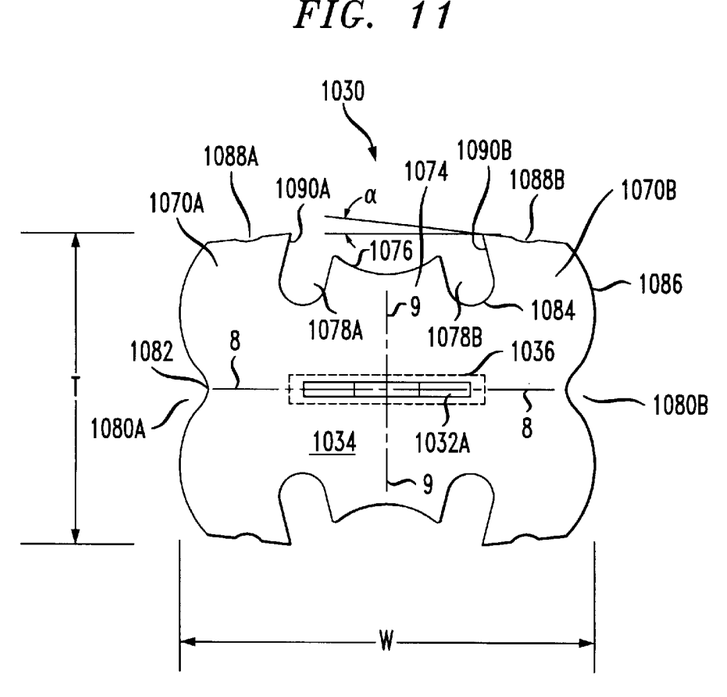
FIG. 11 depicts a third embodiment of the present packing member.

It will be understood that in other embodiments, other packing members having other arrangements of features defining other non-uniform object receiving surfaces (i.e., other than the profiles depicted in FIG. 7) can be used to generate a force(s) that opposes motion of a constrained but moving elongate object. Indeed, two of such alternative embodiments are depicted in FIGS. 9–11. The embodiment depicted in FIG. 7 will therefore be considered representative or illustrative of several features or attributes that are advantageously manifested in preferred embodiments of the present packing members. Preferred packing members will incorporate one or more of such features, as were described above and summarized again below.

1. Some embodiments of preferred packing members will provide for vertical displacement of lobes or other features. This can be accomplished, for example, by "undercutting" (see above description) or otherwise providing a notch, recess or like indentation between the upper lobes and the lower lobes (see, e.g., notches 980A,B of FIG. 9 and notches 1080A,B of FIG. 11).
2. Some embodiments of preferred packing members will provide for lateral displacement of lobes or other features, such as by providing a lateral separation between lobes (or between one lobe and other features). Such separation can be created, for example, using notches, gaps or channels (see, e.g., channels 978A,B of FIG. 9 and channels 1078A,B of FIG. 11). Moreover, lateral displacement is facilitated by "undercutting" the lobe.
3. Some embodiments of preferred packing members will exhibit vertical symmetry (e.g., symmetry across axis 3—3 in FIG. 7).
4. Some embodiments of preferred packing members will exhibit lateral symmetry (e.g., symmetry across axis 4—4 in FIG. 7).

FIGS. 9–11 depict two additional embodiments of packing members that illustrate just two of the many other ways in which the preferred attributes/features described above can be implemented in accordance with the present invention.

FIG. 9 depicts an end view of a second embodiment of a non-uniform object-receiving surface suitable for generating a force to oppose motion of a constrained object. FIG. 10 shows a perspective view of packing member 930 having the features depicted in FIG. 9. As will be clear from the following description, the embodiment depicted in FIGS. 9 and 10 possesses all the preferred attributes described above.

Illustrative exterior portion 934 of packing member 930 includes, above vertical symmetry axis 7—7, lobes 970A and 970B that flank central ridge 974. In the illustrated embodiment, central ridge 974 has a concave surface 976. Channel 978A separates lobe 970A and central ridge 974. Similarly, channel 978B separates lobe 970B and central ridge 974. Such channels allow for lateral displacement of exterior portion 934 in response to a compressive force.

Notches 980A and 980B are aligned with vertical symmetry axis 7—7. Such notches promote vertical displacement in response to a compressive force. Exterior portion 934 encloses interior portion 936. Packing member 930 includes two tabs or protrusions (only tab/protrusion 932A is depicted in FIGS. 9 and 10). One such tab depends from each end of packing member 930. The tabs are used to engage packing member 930 to a frame (not shown in FIGS. 9 and 10), such as frame 200. The profile and features below vertical symmetry axis 7—7 are advantageously identical to the profile and features that are described above.

A third embodiment of an illustrative non-uniform object-receiving surface suitable for generating a force to oppose motion of a constrained object is depicted, via an end view, in FIG. 11. Like the second embodiment, the third embodiment possesses all the preferred attributes described above.

Illustrative exterior portion 1034 of packing member 1030 includes, above vertical symmetry axis 8—8, radiused lobes 1070A and 1070B that flank central ridge 1074. In the illustrated embodiment, central ridge 1074 has a concave surface 1076. Channel 1078A separates lobe 1070A and central ridge 1074. Similarly, channel 1078B separates lobe 1070B and central ridge 1074. Such channels allow for lateral displacement of exterior portion 1034 in response to a compressive force.

The receiving surface of lobes 1070A and 1070B are "inclined" by an angle $\alpha$ towards horizontal or lateral symmetry axis 9—9. As a result of such upward inclination, movement of a pipe (not shown) sliding over lobe 1070B towards lobe 1070A is resisted by face 1090A, and, similarly, face 1090B resists motion of a pipe sliding over lobe 1070A towards lobe 1070B.

Grooves 1088A and 1088B, which are disposed in respective lobes 1070A and 1070B, assist in restricting motion of pipe across exterior portion 1034 of packing member 1030.

Notches 1080A and 1080B are aligned with vertical symmetry axis 8—8. Such notches promote vertical displacement in response to a compressive force. Exterior portion 1034 encloses interior portion 1036. Packing member 1030 includes two tabs or protrusions (only tab/protrusion 1032A is depicted in FIG. 11). One of such tabs depends from each end of packing member 1030. The tabs are used to engage the packing member to a frame (not shown in FIG. 11), such as frame 200.

The profile and features below vertical symmetry axis 8—8 are advantageously identical to the profile and features that are described above.

In one embodiment, representative dimensions (in millimeters—mm) for exterior portion 1034 are as follows:
- thickness T of exterior portion: 102 mm
- width W of exterior portion: 134 mm
- angle α of inclination lobes (e.g., lobe 1070B): 6 degrees
- width of grooves (e.g., groove 1088A): 9.5 mm
- depth of grooves (e.g., groove 1088A): 2 mm
- radius of surface 1086 of lobes (e.g., lobe 1070B): 38 mm
- radius of surface 1082 of notches (e.g., notch 1080A): 7.5 mm
- radius of surface 1076 of central ridges: 26.5 mm
- radius of surface 1084 of channels (e.g., channel 1078B): 7.5 mm It should now be clear that the present teachings concerning the configuration of the exterior portion of the packing member to generate a force (that advantageously increases) to oppose motion of a constrained object, can be implemented via a variety of arrangements. Those skilled in the art will be able to apply the principles of the present invention to develop other suitable non-uniform object-receiving surfaces. Simple testing can verify the efficacy of such other profiles.

In the illustrative embodiments depicted in FIGS. 7–11, the regionally variable compression-causing configuration comprises a non-uniform object-receiving surface. In other embodiments, the object-receiving surface is uniform, but the resilience/density of the material underlying the receiving surface varies regionally. Such underlying regional variations can cause the object-receiving surface of the resilient exterior portion to deform in a non-uniform manner such that forces generated therein are imparted to an overlying and moving object (e.g., a pipe) to oppose motion thereof. In one embodiment, the resilience/density of the material can be locally varied by selectively removing material from (e.g., forming holes or "pores" within) the resilient exterior portion.

It is to be understood that the above-described embodiments are merely illustrative of the invention and that many variations can be devised by those skilled in the art without departing from the scope of the invention. It is therefore intended that such variations be included within the scope of the following claims and their equivalents.

I claim:

1. An article comprising:
   a first packing member having a resilient exterior portion, wherein said resilient exterior portion has a first physical adaptation for generating a force in response to, and in opposition to, movement of an object across said first packing member, wherein the generated force increases in magnitude with movement of said object across said first packing member.

2. The article of claim 1 wherein said first physical adaptation comprises a regionally variable compressing-causing configuration that causes regional increases in compression of said resilient exterior portion as said object moves across said first packing member.

3. The article of claim 1 wherein said first physical adaptation comprises a non-uniform object-receiving surface.

4. The article of claim 1 further comprising:
   a first frame having a second physical adaptation for receiving said first packing member.

5. The article of claim 4 wherein said second physical adaptation comprises a variable positioning element.

6. The article of claim 5 wherein said first frame comprises:
   a base having a first end and a second end; and
   first and second vertically-oriented members, wherein
      said first vertically-oriented member depends from said first end of said base, and
      said second vertically-oriented member depends from said second end of said base.

7. The article of claim 6 wherein said variable positioning element comprises:
   a first channel in said first vertically-oriented member, and
   a second channel in said second vertically-oriented member, wherein
      said first and second channels are disposed in facing sides of said respective first and said second vertically-oriented members so that:
         said first channel receives a first end of said first packing member, and
         said second channel receives a second end of said first packing member.

8. The article of claim 5 further comprising:
   a compressing arrangement for forcing said object against said first packing member.

9. The article of claim 5 further comprising:
   a second packing member received by said first frame, wherein said object is sandwiched at a first region along its length between said first and second packing members.

10. The article of claim 9 further comprising:
    a second frame having a third physical adaptation for receiving a third and a fourth packing member, wherein said third and fourth packing member are operable to sandwich said object at a second region along its length, which second region is spaced from said first region.

11. The article of claim 10 further comprising:
    a connector for linking said first and second frames, wherein said connector maintains said first and second frames in spaced relation to one another.

12. The article of claim 11 wherein said connector comprises openings for receiving prongs engaged to a mechanism suitable for lifting said article.

13. An article for handling a plurality of elongate objects, comprising:
    a first and a second packing member, each of said first and second packing members comprising a linear object-receiving surface for receiving said plurality of elongate objects;
    a variable positioning element that receives said first and second packing members; and
    a compressing arrangement for forcing said second packing member towards said first packing member.

14. The article of claim 13 further comprising a third packing member received by said variable positioning element, wherein:
    said first, second and third packing members are identical;
    said first and second packing members are operable to sandwich a first portion of said elongate objects, said first portion having a first diameter or geometry; and
    said second and third packing members are operable to sandwich a second portion of said elongate objects, said second portion having a second diameter or geometry different from the first diameter.

15. A packing member for use with articles for storing and/or transporting elongate members, comprising:
    a rigid inner portion; and
    a resilient exterior portion, wherein said resilient exterior portion has a physical configuration that is operable to generate a force that opposes motion of said elongate members over said packing member, which generated force increases with said motion of said elongate members across said resilient exterior portion.

16. The packing member of claim 15, said physical configuration of said exterior portion comprising:
   first and second opposed lobes; and
   a region between said first and second opposed lobes that provides for lateral movement of said first and second opposed lobes.

17. The packing member of claim 16 wherein said first and second opposed lobes, and said region between said first and second opposed lobes, define a first half of said exterior portion, wherein said first half is above a vertical symmetry axis, said packing member further comprising:
   a second half of said exterior portion, said second half comprising:
      third and fourth opposed lobes; and
      a region between said first and second opposed lobes that provides for lateral
   movement of said first and second opposed lobes.

18. The packing member of claim 17 further comprising:
   a first indentation disposed between said first lobe and said third lobe, said indentation providing for vertical movement of said first and third lobe; and
   a second indentation disposed between said second lobe and said fourth lobe, said indentation providing for vertical movement of said second and said fourth lobe.

19. A method for restraining motion of elongate objects during transportation thereof, comprising:
   constraining said elongate members between two surfaces;
   generating a force that opposes motion of elongate objects across said two surfaces, which force increases with motion of said elongate objects across said two surfaces.

20. A method for making an apparatus for restraining motion of elongate objects, comprising:
   providing first and second packing members, each of which is physically adapted to exhibit regional variations in compression in response to motion of elongate objects thereover;
   providing a variable positioning element that receives said first and second packing members; and
   providing a compressing arrangement that forces said first and second packing members towards each other.

* * * * *